UNITED STATES PATENT OFFICE.

ANTON FONIO, OF LANGNAU, AND WILLY FÖHRENBACH, OF BASEL, SWITZERLAND, ASSIGNORS TO SOCIETY OF CHEMICAL INDUSTRY IN BASLE, OF BASEL, SWITZERLAND.

LIPOIDLIKE, BLOOD-CLOTTING SUBSTANCE AND A PROCESS OF MAKING SAME.

1,240,694.  Specification of Letters Patent.  Patented Sept. 18, 1917.

No Drawing.  Application filed June 8, 1915. Serial No. 32,934.

*To all whom it may concern:*

Be it known that we, Dr. ANTON FONIO, a citizen of the Swiss Republic, and resident of Langnau, Canton of Berne, Switzerland, and Dr. WILLY FÖHRENBACH, a subject of the Grand Duke of Bade, and resident of Basel, Switzerland, have invented a Lipoidlike, Blood-Clotting Substance and a Process of Making Same, of which the following is a full, clear, and exact specification.

It is known that the applicant Fonio was the first, who relying upon the investigations of Morawitz, Bordey and Delange prepared in the clinical surgery of Professor Kocher at Berne from blood substances promoting the clotting or coagulation of blood in a form practically useful and employed the same successfully for therapeutic purposes. In consequence thereof Kocher and Fonio introduced in the course of time the blood clotting product prepared by Fonio and called "Coagulen" with a large success in the therapeutics and especially in the chirurgical technic.

In further pursuance of the said searches effected by Fonio we have found a new process giving a substance possessing at a high degree the property of promoting the clotting of blood and having in comparison with the substances of analogous action hitherto known a considerably higher activity, a greater purity and being furthermore of an easier preservation and of an easier and more sure administration. The new process consists in evaporating at a low temperature the greater part of the alcohol of an alcoholic blood extract, mixing the residue of the distillation with water, agitating the emulsion so obtained with a chlorinated hydrocarbon as for instance chloroform, precipitating from the solution so obtained the therapeutically valuable substance by adding acetone, extracting the precipitate thus obtained with ether and concentrating the resulting solution by evaporating the same *in vacuo* eventually after an addition of powdered sugar.

Example: To 40 liters of magnesium blood or oxalate blood are added 120 liters of strong alcohol and the mixture is boiled for 5 hours while stirred and cooled under a reflux cooler. The alcoholic blood extract thus obtained is filtered at 70° C., the part insoluble in alcohol is lightly pressed and boiled again with 40 liters of strong alcohol for 5 hours in the manner above indicated. After filtration at 70° C. the residue is strongly pressed. The alcoholic solution is immediately evaporated in a high vacuum and at a low temperature; toward the end of the distillation 10 liters of distilled water are drawn into the evaporator and the distillation is conducted in such a manner that the final residue is constituted by 16 to 20 liters of emulsion.

This emulsion is agitated
(1) with 5 liters chloroform and
(2) with 3 liters chloroform
for 10 minutes in each case.

To the solution in chloroform is added acetone, whereby a large precipitation occurs, while the non-active bodies remain dissolved in the mixture of chloroform and acetone. The precipitate is separated by filtration, washed with acetone and finally extracted with ether and the resulting solution in ether is evaporated to dryness *in vacuo* after an addition of powdered sugar. One gram of this mixture with sugar corresponds to 8 grams of blood.

If 2 ccm. of a 10 per cent. solution of blood-plasma, $\frac{1}{2}$ ccm. of blood-serum and $\frac{1}{2}$ ccm. of a mixture of sugar and of the new substance containing 2 per cent. f this latter are mixed, the mixture clots or coagulates after 5 to 7 minutes, while a mixture of 2 ccm. of a 10 per cent. solution of blood plasma, $\frac{1}{2}$ ccm. of blood serum and $\frac{1}{2}$ ccm. of a physiological solution of common salt does not clot after 55 minutes.

The preparation of high activity and able to be kept for a long time thus obtained is a lipoidlike substance of clear-brown to yellowish-white color (according to the kind of blood with which it has been prepared) containing carbon, hydrogen, phosphorus and traces of iron. It dissolves very easily in benzene and carbon tetrachlorid, sufficiently easily in chloroform, ether, toluene and carbon disulfid, only partly in alcohol with a yellow coloration and is insoluble in acetone. The substance is employed as sterile solution, for instance, inclosed in ampullæ. It dissolves in water to colloidal solutions and is administered per os or by subcutaneous or intravenous injections.

In the described example the chloroform can be replaced by another chlorinated hydrocarbon as for instance ethane tetrachlorid, ethylene perchlorid, ethane perchlorid, carbon tetrachlorid, etc.

What we claim is:

1. The herein described process for the manufacture of a blood-clotting substance consisting in evaporating at a low temperature the greater part of alcohol of an alcoholic blood extract, mixing the residue of the distillation with water, agitating the so obtained emulsion with a chlorinated hydrocarbon, precipitating from the solution in a chlorinated hydrocarbon the therapeutically valuable substance by adding acetone, extracting the precipitate thus obtained with ether and concentrating the resulting solution by evaporating the same in vacuo.

2. The herein described process for the manufacture of a blood-clotting substance consisting in evaporating at a low temperature the greater part of alcohol of an alcoholic blood extract, mixing the residue of the distillation with water, agitating the so obtained emulsion with chloroform, precipitating from the solution in chloroform the therapeutically valuable substance by adding acetone, extracting the precipitate thus obtained with ether and concentrating the resulting solution by evaporating the same in vacuo.

3. The hereon described process for the manufacture of a blood-clotting substance consisting in evaporating at a low temperature the greater part of alcohol of an alcoholic blood extract, mixing the residue of the distillation with water, agitating the so obtained emulsion with chloroform, precipitating from the solution in chloroform the therapeutically valuable substance by adding acetone, extracting the precipitate thus obtained with ether and concentrating the resulting solution by evaporating the same in vacuo after powder-sugar has been added.

4. As a new article of manufacture the herein described new blood clotting, lipoid-like, therapeutically valuable substance derived from blood, constituting a clear-brown to yellowish-white powder and containing carbon, hydrogen, phosphorus and traces of iron, being easily soluble in benzene and carbon tetrachlorid, sufficiently soluble in chloroform, ether, toluene and carbon disulfid, only partly soluble in alcohol with a yellow coloration, insoluble in acetone, soluble in water to colloidal solutions and administered per os or by subcutaneous or intravenous injections.

In witness whereof we have hereunto signed our names this 18th day of May 1915, in the presence of two subscribing witnesses.

Dr. ANTON FONIO.
Dr. WILLY FÖHRENBACH.

Witnesses:
M. BERTSCHINGER,
AMAND BRAUN.

Copies of this patent may be obtained for five cents each, by addressing the "Commissioner of Patents, Washington, D. C."